Figure 3A:
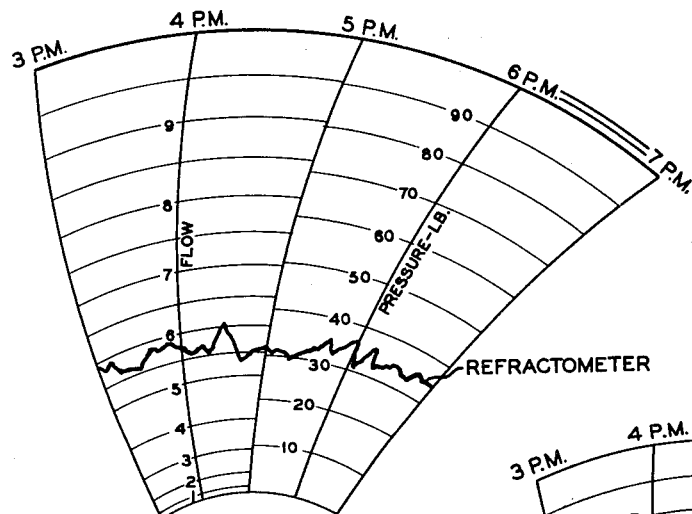

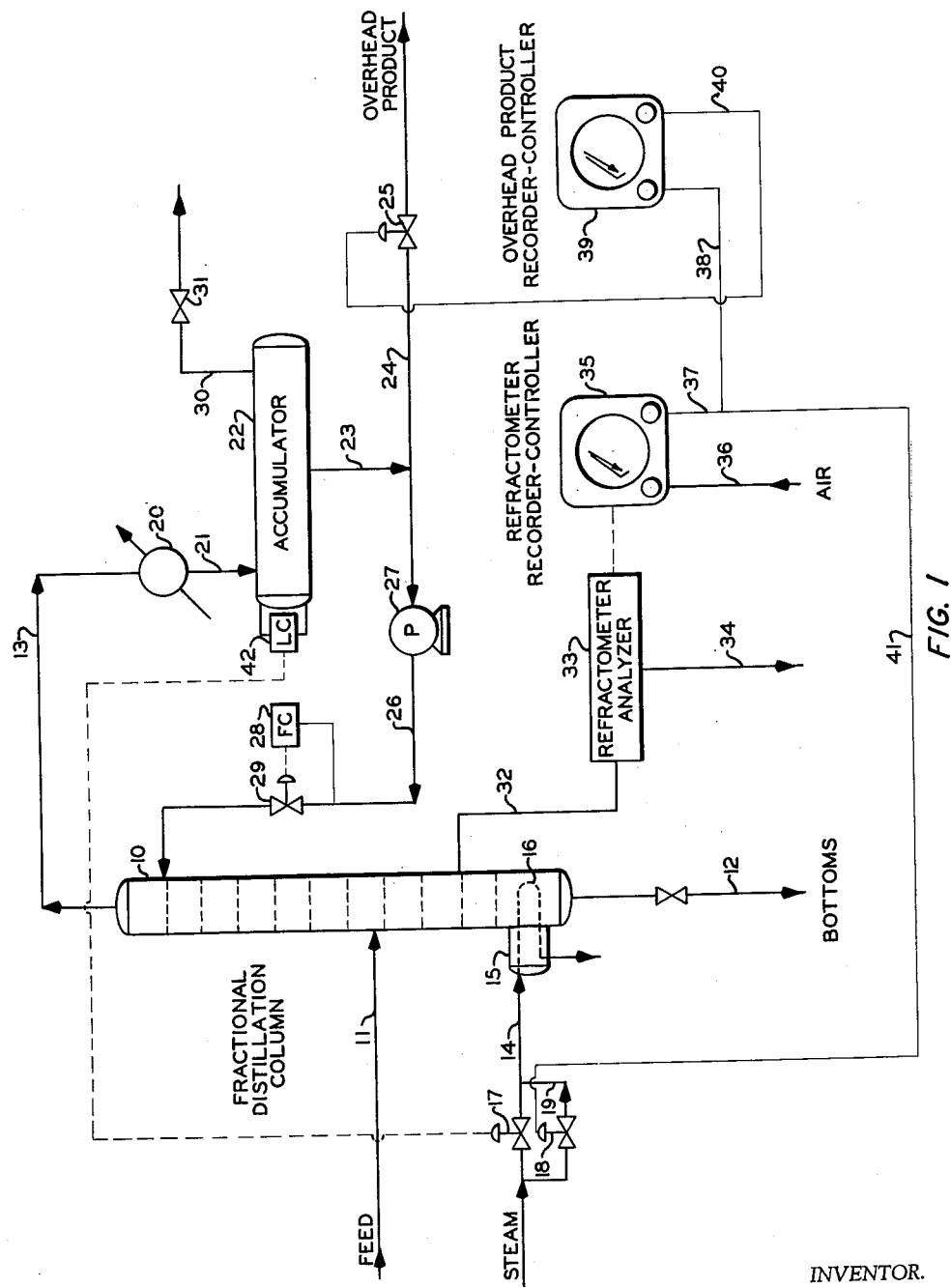

May 1, 1962  B. J. NORMAN  3,032,479
SEPARATION PROCESS AND CONTROL SYSTEM THEREFOR
Filed June 16, 1958  3 Sheets-Sheet 2

INVENTOR.
B. J. NORMAN
ATTORNEYS

CONCENTRATION OF n-HEXANE ON 10 TH
TRAY FROM BOTTOM OF COLUMN
n-HEXANE-CYCLOHEXANE SEPARATION

CONCENTRATION OF n-HEXANE ON 10 TH
TRAY FROM BOTTOM OF COLUMN
n-HEXANE-CYCLOHEXANE SEPARATION

INVENTOR.
B. J. NORMAN

ATTORNEYS

United States Patent Office 3,032,479
Patented May 1, 1962

1

3,032,479
SEPARATION PROCESS AND CONTROL
SYSTEM THEREFOR
Billy J. Norman, Borger, Tex., assignor to Phillips
Petroleum Company, a corporation of Delaware
Filed June 16, 1958, Ser. No. 742,248
8 Claims. (Cl. 202—40)

This invention relates to the separation of multi-component fluid mixtures into their various components.

In one aspect, this invention relates to a process for separating a multi-component fluid mixture into its various components in a fractional distillation column.

In another aspect, this invention relates to a method of controlling a fractional distillation column to maintain steady state operating conditions.

In another aspect, this invention relates to a control system for a fractional distillation column wherein the rate of heat input into said fractional distillation column is regulated in accordance with the concentration within said fractional distillation column of a component present in the fluid being separated.

As is well known to those familiar with refining operations, fractional distillation is a separation process wherein two or more substances of different volatility are separated by some combination of evaporating, condensing, and vapor-liquid contacting steps. A fractional distillation column having a plurality of spaced bubble trays or the like on which the vapors and liquid make contact with one another is used for performing these steps. The feed mixture is usually introduced at some intermediate point in the column and heat is supplied to the lower portion of the column to provide for evaporation of the material being separated. The vapor is ultimately condensed at the top of the column, with a portion of the condensate being removed as the overhead product and the remainder being returned to the column as reflux from an accumulator located outside of the column. The less volatile substance is removed from the bottom of the column as the bottoms fraction. The transfer of a quantity of heat upwardly through the column results in a certain net transfer of material, and the separation obtained between the overhead and bottoms fractions is a function of the number of contacting steps employed and the reflux ratio. For steady state operation, both heat and material transfer must be in balance and it is toward maintaining such a condition that the various control systems known in the art have been provided.

In present types of continously operating fractionating columns and control systems, a composition indicating and controlling device measures the concentration of some component in the mixture to be separated at some point within the fractional distillation column and regulates the introduction of heat into the lower portion of the column in accordance with variations in the concentration measured. The difficulty in establishing manual control of the column and in starting up the column is a disadvantage in this method of controlling the introduction of heat into the column to maintain steady state conditions. Composition indicating and controlling devices have also been used in the art to regulate the rate of withdrawal of overhead product from the accumulator with a liquid level control means on the accumulator being employed to regulate the introduction of heat into the lower portion of

2 the column in order to maintain fairly stable operating conditions. The disadvantage in this method of controlling the column is that the large volume of the accumulator, requiring substantial changes in volume of overhead product before measurable changes in liquid level result, is reflected in very erratic operation with very slow response being obtained from the composition indicating and controlling device. It is desirable that a control system be provided having the advantages of each of these methods of control without encountering the individual disadvantages.

I have now discovered that the signal from a composition sensing means used to regulate the overhead product withdrawal rate from a fractional distillation column, as well as to regulate the rate of heat input to said fractional distillation column through a liquid level control means operating on an overhead accumulator, can also be applied directly to the above indirect regulation of the heat input to said fractional distillation column, and in combination therewith, to obtain a more effective control system for a fractional distillation column providing fast response to variations in operating conditions.

An object of this invention is to provide an efficient process for separating multi-component fluid mixtures into their various components in a fractional distillation column wherein substantially constant rate of flow of overhead product and uniform composition of overhead product are obtained.

Another object of this invention is to provide a method of controlling a fractional distillation column to obtain steady state operating conditions by providing dual regulation of the heat input to said fractional distillation column in response to the concentration of a component present in the fluid being separated.

Another object of this invention is to provide a control system for a fractional distillation column wherein the rate of heat input to said fractional distillation column is immediately responsive to the concentration within said fractional distillation column of one of the components present in the fluid being separated.

Another object of this invention is to provide a control system for a fractional distillation column wherein indirect regulation of the heat input to said column in response to the concentration within said column of one of the components present in the fluid being separated is overridden by direct regulation of the heat input to said column in additional response to the concentration within said column of one of the components present in the fluid being separated.

Another object of this invention is to provide a control system for a fractional distillation column wherein there is simultaneous dampened and undampened regulation of the rate of heat input to said column.

Other aspects, objects and advantages of the invention are apparent from a consideration of the accompanying disclosure, drawings and the appended claims.

In accordance with the invention, there is provided an improved process for separating multi-component fluid mixtures into their various components in a fractional distillation column, including a method of control and a control system, wherein highly efficient separation is obtained with the recovery of overhead product of substantially constant concentration at a substantially constant rate of withdrawal by maintaining a substantially constant concentration of one component at some region within said fractional distillation column.

Further, in accordance with the invention, there is provided a method of controlling a fractional distillation column whereby a single signal from a concentration measuring means, which determines the concentration at some region in said fractional distillation column of a component present in the fluid being separated, is used both to indirectly regulate the rate of input of heat to said fractional distillation column through regulation of the withdrawal of overhead product from an accumulator in combination with a liquid level control means on said accumulator and to directly regulate the rate of input of heat to said fractional distillation column. Thus, the invention provides dual control of the rate of heat input to a fractional distillation column in response to the composition of the fluid being separated as determined within a fractional distillation column; that is, direct, undampened regulation of the heat input to said fractional distillation column, as well as indirect, dampened regulation of the heat input to said fractional distillation column.

Also, in accordance with the invention there is provided a control system for a fractional distillation column which includes, in combination, measuring means for determining the concentration at some point in said fractional distillation column of one component present in the fluid being separated, automatic control means for regulating the withdrawal of overhead product from an accumulator in accordance with the concentration of said measured component, detecting means for determining the liquid level in said accumulator, first automatic control means for regulating the rate of heat input to said fractional distillation column in accordance with said liquid level, and second automatic control means for additionally regulating the rate of heat input to said fractional distillation column in accordance with the concentration of said measured component.

Figure 3B:
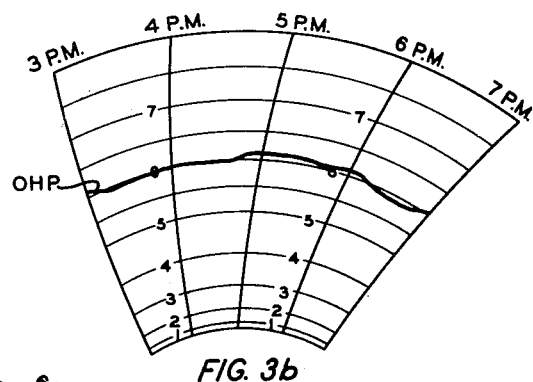
Figure 2:
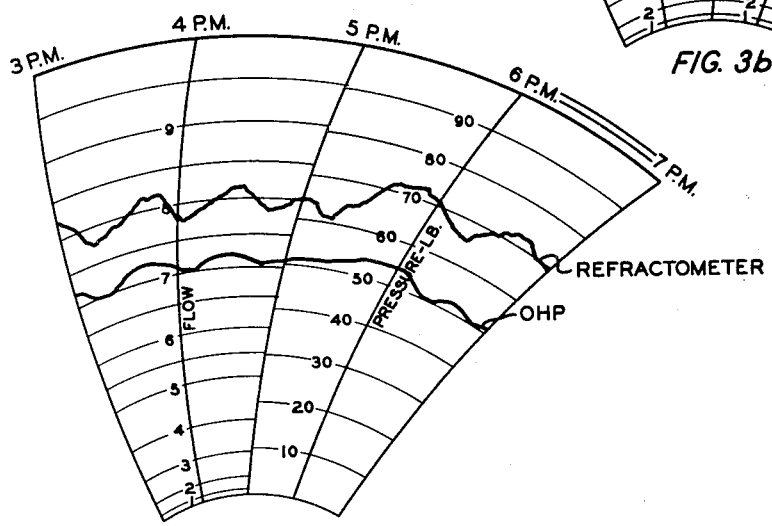
Figure 4A:
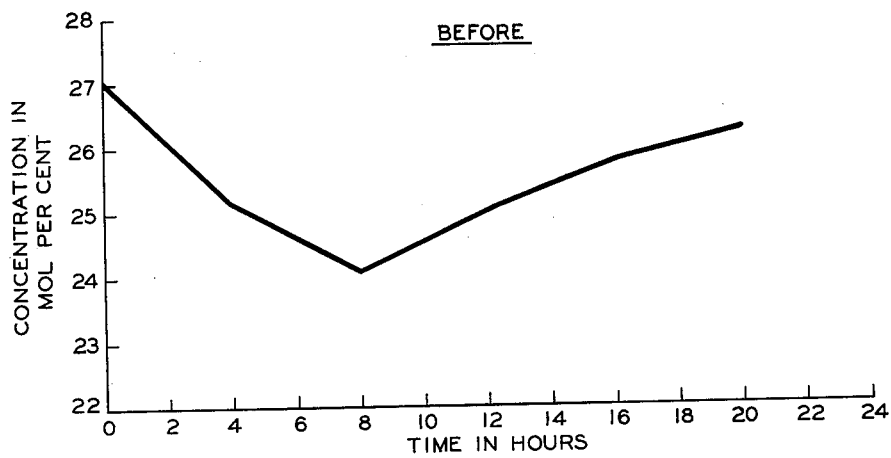
Figure 4B:
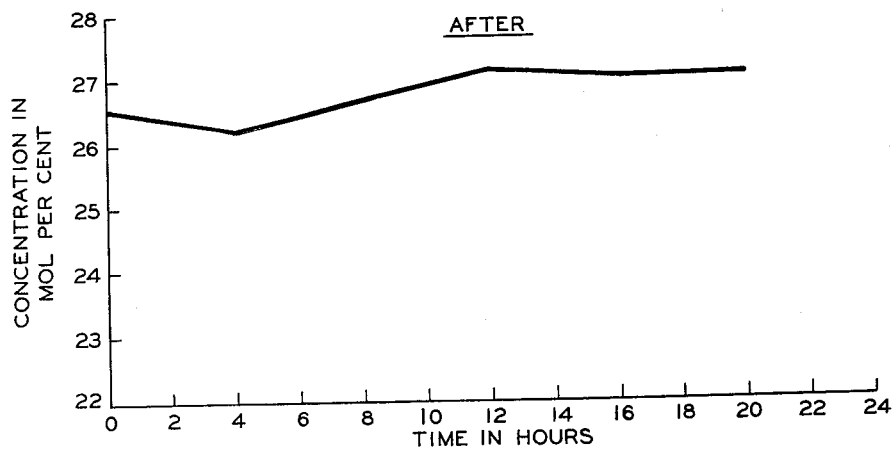

Referring to the drawings, FIGURE 1 is a schematic view of a separating column together with analysis and control apparatus associated therewith. FIGURE 2 is a portion of a chart from a recorder-controller showing the variations in value of refractometer readings and overhead product flow rates obtained from a fractional distillation column wherein a control system of the prior art is used. FIGURE 3a is a chart from a recorder-controller obtained from a fractional distillation column wherein the control system of this invention is used. FIGURE 3b is a chart from a recorder-controller obtained with a fractional distillation column using the control system of this invention and showing the variations in flow rates of the overhead product. FIGURE 4a is a graph showing the wide variation over a period of time of the concentration of a component being separated on a particular tray in a fractional distillation column not controlled by the control system of this invention. FIGURE 4b is a graph showing the minor variation over a period of time of the concentration of a component being separated on a particular tray in a fractional distillation column controlled by the control system of this invention.

Referring to FIGURE 1, there is shown a fractional distillation column 10 of any suitable design employing contacting means, such as perforated plates, bubble decks, or the like. The feed mixture to be fractionated is supplied through inlet conduit 11 at a rate which can be controlled by a conventional rate of flow controller, not shown, to an intermediate point in column 10 wherein said feed mixture is separated into a liquid bottom fraction which is withdrawn through conduit 12 and a lower boiling overhead vaporous or gaseous stream which is withdrawn through conduit 13.

Heat is supplied to the lower portion of column 10 through conduit 14 to a reboiler section 15 containing a steam coil 16 wherein steam introduced through conduit 14 gives up its heat to the mixture being separated in the lower portion of column 10. The rate of flow of steam or other heating medium is regulated by adjustable valve 17, as well as by adjustable valve 18 in conduit 19 by-passing adjustable valve 17 in a manner which is more fully described hereinafter.

The vapors and/or gases comprising the relatively light components of the feed mixture supplied to column 10, which are not retained in the heavier reboiled bottoms fraction, are directed from the upper portion of the column 10 through conduit 13 to condenser 20 wherein they are partially or completely condensed, as desired, and wherefrom resulting condensate, together with any uncondensed components, is directed through conduit 21 to reflux accumulator 22. A regulated quantity of distillate collected in accumulator 22 is discharged therefrom through conduits 23 and 24. Adjustable valve 25 in conduit 24 controls the overhead product flow rate in a manner which is more fully described hereinafter. In order to provide refluxing liquid for column 10, a quantity of distillate collected in accumulator 22 is directed through conduits 23 and 26 under pressure from pump 27 to the upper portion of column 10. Flow rate control assembly 28 regulates adjustable valve 29 to maintain substantially constant rate of flow of reflux. Uncondensed gases are removed from accumulator 22 by means of conduit 30 at a rate determined by the opening of valve 31. Usually, condenser 20 is operated at a condition sufficient to substantially completely condense the overhead product discharged from column 10 through overhead line 13 so that only non-condensible type gases are found in accumulator 22.

A sample stream is withdrawn from column 10 through conduit 32 from a tray located in the lower portion of column 10 below the point where feed is introduced into column 10 to refractometer analyzer 33 and then discharged or returned to column 10 through conduit 34. Analyzer 33 is adapted to provide an electrical signal, the magnitude of which is indicative of the concentration of one component present in the fluid mixture being fractionated. This electrical signal is transmitted to a potentiometer air-operated recorder-controller 35 which provides both a continuous record of the concentration of the component in the sample stream under analysis and also an output air pressure representative of such component concentration. Air is supplied to refractometer recorder-controller 35 through conduit 36. A portion of the output air pressure is transmitted to conduits 37 and 38 to overhead product recorder-controller 39. An output air pressure is transmitted through conduit 40 from overhead product recorder-controller 39 to regulate the position of adjustable valve 25 in conduit 24 to thereby control the rate of withdrawal of overhead product from accumulator 22. The remaining portion of the output air pressure from refractometer recorder-controller 35 is transmitted through conduits 37 and 41 to adjustable valve 18 in conduit 19 to provide an override control on the rate of steam addition through conduit 14 to the reboiler section 15 of column 10.

The basic regulation of rate of flow of steam to reboiler 15 of column 10 is provided by liquid level control assembly 42 attached to accumulator 22 and adapted to regulate the position of adjustable valve 17 in steam inlet conduit 14.

In operation, the feed mixture to be separated enters column 10 through conduit 11 and is separated into an overhead fraction and a bottoms fraction within column 10. Under steady state conditions of operation, the concentration of any specific component in either the overhead or the bottoms fractions must remain substantially constant on any tray or contact device within column 10. As shown in FIGURE 1, a sample is withdrawn from column 10 through conduit 32 and the concentration of a specific component is determined in refractometer analyzer 33. Other composition analyzer devices, such as